(12) United States Patent
Jouenne et al.

(10) Patent No.: US 10,989,234 B2
(45) Date of Patent: Apr. 27, 2021

(54) FLOW CONTROL VALVE INCLUDING A PLURALITY OF TUBES HAVING A GEOMETRICALLY VARIABLE CROSS-SECTION

(71) Applicant: TOTAL SA, Courbevoie (FR)

(72) Inventors: Stéphane Jouenne, Bizanos (FR); Guillaume Heurteux, Morlaas (FR)

(73) Assignee: TOTAL SA, Courbevoie (FR)

( * ) Notice: Subject to any disclaimer, the term of this patent is extended or adjusted under 35 U.S.C. 154(b) by 0 days.

(21) Appl. No.: 15/106,607

(22) PCT Filed: Dec. 19, 2014

(86) PCT No.: PCT/FR2014/053483
§ 371 (c)(1),
(2) Date: Jun. 20, 2016

(87) PCT Pub. No.: WO2015/092334
PCT Pub. Date: Jun. 25, 2015

(65) Prior Publication Data
US 2017/0037700 A1    Feb. 9, 2017

(30) Foreign Application Priority Data

Dec. 19, 2013  (EP) .................................... 13306796

(51) Int. Cl.
| | |
|---|---|
| *F15D 1/02* | (2006.01) |
| *F16K 47/08* | (2006.01) |
| *E21B 34/14* | (2006.01) |
| *E21B 43/20* | (2006.01) |

(Continued)

(52) U.S. Cl.
CPC ................ *F15D 1/02* (2013.01); *E21B 34/14* (2013.01); *E21B 43/20* (2013.01); *F16K 3/03* (2013.01);
(Continued)

(58) Field of Classification Search
CPC . F15D 1/02; F15D 1/025; F16K 47/04; F16K 47/08; Y10T 137/86718; Y10T 137/86734
(Continued)

(56) References Cited

U.S. PATENT DOCUMENTS 3,447,566 A    6/1969  Hayner et al.
3,917,221 A *  11/1975 Kubota .................. F16K 47/08
                                                    137/625.37

(Continued)

FOREIGN PATENT DOCUMENTS

| | | |
|---|---|---|
| DE | 2810118 A1 | 9/1979 |
| WO | WO2012001671 A | 1/2012 |
| WO | WO 2012136890 A1 * | 10/2012 ........ F16L 55/02718 |

OTHER PUBLICATIONS

International Search Report for PCT/FR2014/053483, dated Jun. 30, 2015, 4 pages.
(Continued)

*Primary Examiner* — Michael R Reid
(74) *Attorney, Agent, or Firm* — Patterson Thuente Pedersen, P.A.

(57) ABSTRACT

The present invention relates to a flow control valve to be connected to a pipe. The valve includes: a plurality of fluid transport tubes having a geometrically variable cross-section and placed in parallel with each other; and a means for connecting to the pipe and located at one end of the fluid transport tubes.

30 Claims, 9 Drawing Sheets

(51) Int. Cl.
*F16K 3/03* (2006.01)
*F16L 55/027* (2006.01)

(52) U.S. Cl.
CPC ........ *F16K 47/08* (2013.01); *F16L 55/02763* (2013.01)

(58) Field of Classification Search
USPC ................. 137/625.28, 625.3; 251/117, 118; 138/40
See application file for complete search history.

(56) References Cited

U.S. PATENT DOCUMENTS

| | | | |
|---|---|---|---|
| 4,007,908 A | 2/1977 | Smagghe et al. | |
| 4,276,904 A | 7/1981 | Jackson | |
| 4,921,014 A * | 5/1990 | Tartaglia | F16K 47/08 137/494 |
| 5,307,830 A * | 5/1994 | Welker | F16K 47/08 137/1 |
| 5,327,941 A * | 7/1994 | Bitsakis | B01F 5/0682 138/42 |
| 2011/0042592 A1* | 2/2011 | Elliott | F16K 47/08 251/120 |
| 2013/0098620 A1* | 4/2013 | Chauveteau | E21B 34/14 166/305.1 |

OTHER PUBLICATIONS

English translation of International Search Report for PCT/FR2014/053483, dated Jun. 30, 2015, 3 pages.

* cited by examiner

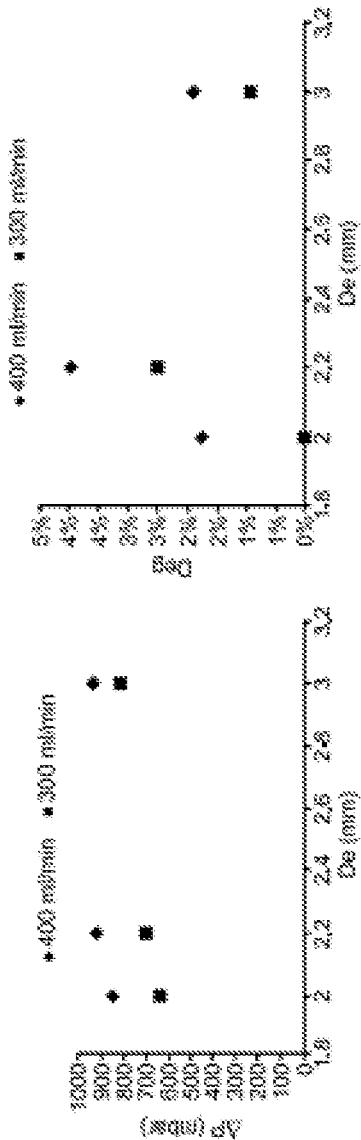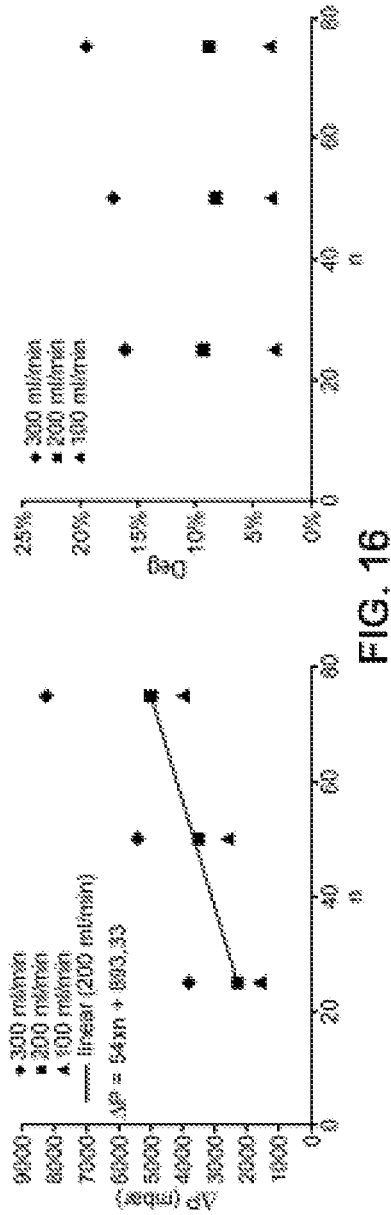
FIG. 15
FIG. 16

FLOW CONTROL VALVE INCLUDING A PLURALITY OF TUBES HAVING A GEOMETRICALLY VARIABLE CROSS-SECTION

RELATED APPLICATIONS

The present application is a National Phase entry of PCT Application No. PCT/FR2014/053483, filed Dec. 19, 2014, which claims priority from EP Patent Application No. 13306796.7, filed Dec. 19, 2013, said applications being hereby incorporated by reference herein in their entirety.

FIELD OF THE INVENTION

The present invention relates to a flow control valve which is especially designed for the transport of polymer solutions, and makes it possible to minimize the mechanical degradation of said polymer solution during its passage in said valve.

BACKGROUND OF THE INVENTION

A flow control valve is a mechanical device used to control the flow of the fluid which passes in a duct. It can thus be used to decrease or to increase the flow of the fluid.

A flow control valve makes it possible to regulate the flow of fluid by creating the loss of load. This loss of load is variable according to the opening of the valve. When a polymer solution passes through a flow control valve, a substantial decrease in the viscosity is observed. Reference is then made to mechanical degradation of the polymer solution.

Within the context of EOR (Enhanced Oil Recovery) the requirement is to develop a new flow control valve model in order to limit the mechanical degradation of the viscous polymer solutions (polyacrylamide, HPAM etc.).

This invention applies to all projects comprising injection of a polymer which is sensitive to mechanical degradation (polymer and surfactant flooding), and to flow control valves at well heads. This is the case in particular for fields developed offshore, or wherein the fluid is transported over long distances. In fact, this type of development comprises an injection line which supplies a plurality of wells, each comprising a flow control valve at the well head.

By way of example, a petroleum field may comprise a plurality of complexes. In general, a single injection line makes it possible to distribute the water to be injected to each of the wells of a complex. Since the head pressure and the hydrodynamic resistance of each of the wells is variable, it is necessary to use a flow control valve at the head of each well, in order to control the flow injected.

In fact, since the head pressure is equal to the pressure at the start of the injection line, less the losses of load between the start of the injection line and the well head, the head pressure of each of the wells is all the greater, the closer the well is to the start of the injection line. The hydrodynamic resistance depends on many factors such as the length of the injection drain, the permeability of the formation, the porosity and the saturation with oil. For example, a well A which injects into an area with low permeability will have injectivity which is far less good than another well B on the same line which injects into a permeable area. In other words, for an identical head pressure, the flow injected into the well A will be lower than that injected into the well B. If it is wished to increase the ratio of flow between the wells A and B, it is necessary to decrease the head pressure of the well B. For this purpose, a valve will be placed at the head of the well B which will create the loss of load required.

For a given flow Q (in m³/h) and a given opening of the valve Op (as a %), the valve will create a loss of load ΔP (in bars). If flow increases, or if the opening of the valve decreases, the loss of load increases. For each opening of the valve, the valve manufacturer provides a coefficient of flow Cv defined as follows:

$$Cv = f(Op) \frac{Q}{\sqrt{\Delta P / G}}$$

where G is the gravitational constant (in m/s²).

Thus, when two variables are set, the third is known. The curve Cv is determined experimentally by the manufacturer. It depends on the geometry of the valve.

Within the context of Enhanced Oil Recovery, a polymer solution is used in order to accelerate the recuperation of the oil, and to increase this recuperation when the production is stopped. In fact dissolving the polymer in the water injected improves control of the mobility, i.e. by increasing the viscosity of the water, the mobility of the water is decreased, which is favorable to improved recuperation of the oil. Thus, the main objective is to maintain the viscosity of the polymer solution injected. However, this polymer solution is very sensitive to shearing. In fact, when it passes into the valve, the polymer chains can break, which gives rise to a decrease in the viscosity of the polymer solution.

The rheological behavior of a polymer solution in a porous medium differs from the behavior in terms of volume (viscosity measured in the rheometer). FIG. 1 illustrates this behavior. With a low level of shearing, the apparent viscosity of the polymer in a porous medium (represented by the curve A) is lower than the viscosity in terms of volume (represented by the curve B). With a low gradient, there is a Newtonian platform, then a rheofluidifying area (decrease of the viscosity with the shearing). Starting from a critical shearing point $\dot{\gamma}_T$ there is observation of rheothickening behavior (increase in the viscosity with the shearing) which will pass through a maximum point, then regain the viscosity of the water at a very high gradient. The rheothickening is associated with the resilient nature of the polymer chains.

The physics of diluted polymer solutions has been quite extensively described. For a level of critical elongation $\dot{\varepsilon}_T$ such as $\dot{\varepsilon}_T \tau > 1$ where $\tau$ is the relaxation time of the polymer chain, the polymer chains undergo transition from a "ball" state to a "drawn" state, which takes the form of the appearance of elongational viscosity which is far greater than the viscosity in terms of volume measured in simple shearing. The hydrodynamic force exerted by the solvent on the polymer chain in a "drawn" state is expressed by $F \propto \eta_S \dot{\varepsilon} L^2$. When this force is greater than the force of the carbon-carbon bond of the chain, the polymer chain breaks, preferentially at its center. A decrease in the molecular mass of the chains leads to a decrease in the viscosity of the solution. This is what is known as the mechanical degradation (represented by the curve D), which takes place at a critical elongation level $\dot{\varepsilon}_D$. A shearing field therefore exists in the porous medium $[\dot{\gamma}_T - \dot{\gamma}_D]$ corresponding to the elongational shearing field $[\dot{\varepsilon}_T - \dot{\varepsilon}_D]$ for which the polymer develops elongational viscosity, without however undergoing significant degradation.

The present control valves s generally consist of a cage pierced with holes with a variable diameter (FIG. 2). The fluid input (E) takes place through the holes in the cage, and the output (P), which is perpendicular, is at the center of the cage. The accessible surface, and thus the number of holes through which the fluid passes, is adjusted by the height of a mobile piston with movement parallel to the axis of the cage. For a given flow, the loss of load increases when the accessible surface at the fluid input decreases.

The origin of the mechanical degradation of the polymer solutions during their passage into a flow control valve is partially known. The polymer chains in solution are flexible balls which are elongated when they are subjected to elongational shearing. When the hydrodynamic forces associated with this field of elongational speeds are great, the polymer chains break.

The present control valves s generate a loss of load by passage of the fluid into holes. This type of geometry creates a high level of elongational shearing as a result of the high contraction ratio between the input of the flow control valve and the holes, thus generating a strong decrease in the viscosity of the polymer solution. Reference is then made to degradation of the polymer solution. Since the viscosity of the polymer solution is a key parameter of the EOR, it is therefore necessary to limit the degradation of the polymer solution injected during its passage through the flow control valve.

Different solutions for flow control valves have been described in order to limit the degradation of the polymer solution.

For example, U.S. Pat. No. 4,276,904 describes a flow control valve which makes it possible to modify a flow of fluid by making the fluid pass into a limited number of pipes with lengths between 3,048 m (10 ft) and 60.96 m (200 ft) and with different diameters between 0.635 cm (0.25") and 2.540 cm (1"). This flow control valve is difficult to implement (in particular it comprises a large number of shutters, which have to be activated independently at the output of each of the pipes, and it is voluminous).

WO 2012/001671 A2 also describes a flow control valve consisting of a capillary system with a constant diameter of between 0.125 mm and 11 mm, which in particular is designed for implementation of a method for injection of a fluid into an underground formation. In this type of flow, the polymer particle is animated by a rapid rotation movement ($\omega=\gamma_c/2$) which subjects the particle to successive elongations and compressions which do not give the particle time to become elongated. On the other hand, in an elongational flow such as in a duct which involves strong contraction, the particle can have the time to become significantly elongated, and consequently be subjected to significant elongation (proportional to the viscosity of the suspension fluid, the gradient of speed of elongation $\gamma_E$ and the square of the length reached L:$F_{e1}$_$\mu$ $\gamma_E$ $L^2$). If this force becomes greater than its internal resistance, the particle breaks and loses its properties. In this case, reference is made to mechanical degradation. However, this valve does not make it possible to reduce the degradation of the polymer solution to percentages lower than 10%, whilst having a size suitable for use in the petroleum industry, in particular on a platform or in a petroleum deposit on land. It is thus desirable to develop a flow control valve which limits the degradation of the polymer solution, and which is compact and easy to implement.

SUMMARY OF THE INVENTION

The applicant has developed a valve for control of flow by loss of load which complies with these requirements. Said valve comprises a plurality of fluid transport pipes with a geometrically variable cross-section which are disposed in parallel relative to one another, and a means for connection to the duct, situated at one end of the said fluid transport pipes. This structure is such that:

1) the flow is subject to very little elongation, and therefore to very little degradation for a mechanically stable polymer solution;
2) the loss of load useful for controlling the flow injected is obtained by maximizing the viscous dissipation with the walls of the pipes, and by developing the elongational viscosity of the polymer solution;
3) the loss of load can be regulated virtually continuously, and as required, thanks to the existence of a large number of pipes disposed in a bundle, which can be opened to the flow as required;
4) the dimensions of the valve are small, and well suited for connection to the duct which provides the injection of fluid into the well;
5) the system for closure/opening of the valve is strong; and
6) since the loss of load takes place over a long length of the pipe rather than during passage through an orifice, the speed of the fluid during passage through the valve is reduced. Far lower attrition is expected, and therefore an improved service life.

From a technical point of view, the valve according to the invention makes it possible to reduce the dimensions because of its compactness, and it is easy to install.

From an economic point of view, the valve according to the invention permits a great saving both in the OPEXes (smaller quantity of polymers to be used) and in the CAPEXes (reduction of the dimensions of the surface installations for the injection of polymer).

The subject of the invention is a flow control valve which is designed to be connected to a duct, said valve comprising:
 a plurality of fluid transport pipes with a geometrically variable cross-section, disposed in parallel relative to one another;
 a means for connection to the duct, situated at one end of the fluid transport pipes.

The geometrically variable cross-section of the fluid transport pipes make it possible to limit the loss of viscosity of the fluid transported.

Optional and non-limiting characteristics of the flow control valve are as follows.

According to one embodiment, the flow control valve is characterized in that the fluid transport pipes with a geometrically variable cross-section have alternation of cross-sections with small diameters and large diameters.

According to one embodiment, the flow control valve is characterized in that the distance between two cross-sections with small diameters is in the range between 0.5 mm and 20 mm.

According to one embodiment, the flow control valve is characterized in that the distance between two cross-sections with large diameters is in the range between 0.5 mm and 20 mm.

According to one embodiment, the flow control valve is characterized in that a cross-section with a small diameter has a diameter of 0.5 mm or more.

According to one embodiment, the flow control valve is characterized in that a cross-section with a large diameter has a diameter of 5 mm or less.

According to one embodiment, the flow control valve is characterized in that the variation from a cross-section with a small diameter to a cross-section with a large diameter is in the form of a crenellation, or in hyperbolic, logarithmic or exponential form.

According to one embodiment, the flow control valve is characterized in that the variation from a cross-section with a large diameter to a cross-section with a small diameter is in the form of a crenellation, or in hyperbolic, logarithmic or exponential form.

According to one embodiment, the flow control valve is characterized in that the ratio of a cross-section with a large diameter to a cross-section with a small diameter is greater than 1 and 10 or less, and in particular is approximately 2.

According to one embodiment, the flow control valve is characterized in that it comprises means for shutting at least some of the fluid transport pipes.

According to one embodiment, the flow control valve is characterized in that the shutting means permit selective shutting of some or all of the fluid transport pipes.

According to one embodiment, the flow control valve is characterized in that the shutting means comprise a diaphragm, fins, a multiple-way valve, or a piston.

According to one embodiment, the flow control valve is characterized in that the fluid transport pipes do not all have identical cross-sections.

According to one embodiment, the flow control valve is characterized in that the fluid transport pipes 3 are disposed in groups with a substantially identical cross-section.

According to one embodiment, the flow control valve is characterized in that the different groups of fluid transport pipes are distributed according to concentric circles, each circle comprising pipes with an identical cross-section, with the cross-sections of the pipes increasing from the interior towards the exterior of the valve.

According to one embodiment, the flow control valve is characterized in that the different groups of fluid transport pipes are distributed according to parallel lines, each line comprising pipes with an identical cross-section, the lines being disposed according to an order with an increasing cross-section.

According to one embodiment, the flow control valve is characterized in that the fluid transport pipes with a geometrically variable cross-section are formed by a stack of washers with different cross-sections.

According to one embodiment, the flow control valve is characterized in that the stack of washers has alternation of washers with small cross-sections and washers with large cross-sections.

According to one embodiment, the flow control valve is characterized in that the thickness of a washer with a small cross-section is equal to the distance between two cross-sections with a large diameter of the fluid transport pipe.

According to one embodiment, the flow control valve is characterized in that the thickness of a washer with a large cross-section is equal to the distance between two cross-sections with a small diameter of the fluid transport pipe.

According to one embodiment, the flow control valve is characterized in that the fluid transport pipes with a geometrically variable cross-section are formed by a stack of perforated discs with holes with different cross-sections.

According to one embodiment, the flow control valve is characterized in that the stack of perforated discs has alternation of discs comprising holes with small cross-sections and discs comprising holes with large cross-sections.

According to one embodiment, the flow control valve is characterized in that the thickness of the disc comprising holes with small cross-sections is equal to the distance between two cross-sections with a small diameter of the fluid transport pipe.

According to one embodiment, the flow control valve is characterized in that the thickness of the disc comprising holes with large cross-sections is equal to the distance between two cross-sections with a large diameter of the fluid transport pipe.

According to one embodiment, the flow control valve is characterized in that the discs are perforated with holes distributed according to concentric circles, each circle comprising holes with an identical cross-section, with the cross-sections of the holes increasing from the interior towards the exterior of the valve.

According to one embodiment, the flow control valve is characterized in that the fluid transport pipes with a geometrically variable cross-section are formed by a stack of square or rectangular plates perforated with holes with different cross-sections.

According to one embodiment, the flow control valve is characterized in that the stack of perforated plates has alternation of plates comprising holes with small cross-sections and plates comprising holes with large cross-sections.

According to one embodiment, the flow control valve is characterized in that the thickness of a plate comprising holes with small cross-sections is equal to the distance between two cross-sections with a small diameter of the fluid transport pipe.

According to one embodiment, the flow control valve is characterized in that the thickness of a plate comprising holes with large cross-sections is equal to the distance between two cross-sections with a large diameter of the fluid transport pipe.

According to one embodiment, the flow control valve is characterized in that the plates are perforated with holes distributed according to parallel lines, each line comprising pipes with an identical cross-section, the lines being disposed according to an order with an increasing cross-section.

BRIEF DESCRIPTION OF THE FIGURES

FIG. 15 represents the degradation of a polymer solution and the loss of load as a function of flow or as a function of diameter De after passage in a fluid transport pipe with a geometrically variable cross-section according to the invention (example 2d).

FIG. 16 represents the degradation of a polymer solution and the loss of load as a function of flow or as a function of the number of contractions/widenings after passage in a fluid transport pipe with a geometrically variable cross-section according to the invention (example 2e).

DETAILED DESCRIPTION OF THE INVENTION

The invention is now described in greater detail, in a non-limiting manner, in the following description.

Figure 3:
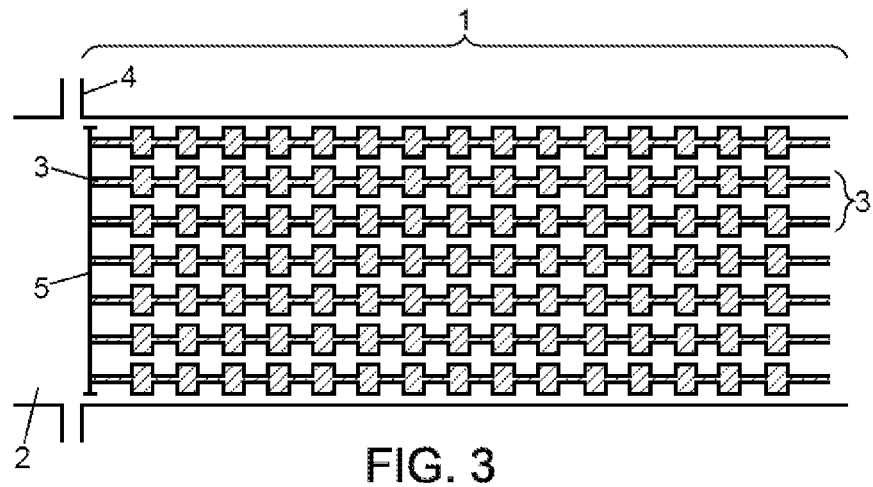
FIG. 3 represents schematically an embodiment of a flow control valve according to the invention.

With reference to FIG. 3, a flow control valve 1 according to the invention is designed to be connected to a duct 2, said valve comprising:
- a plurality of fluid transport pipes 3 with a geometrically variable cross-section, disposed in parallel relative to one another;
- a means 4 for connection to the duct 2, situated at one end of the fluid transport pipes 3.

The duct 2 comprises a single pipe. It is connected at one end to the plurality of fluid transport pipes 3 by a connection means 4, and is connected at its other end to fluid supply means (not represented). Generally, these supply means comprise a fluid tank and a pumping means. A plurality of ducts 2 can be connected to a single fluid tank and to a single pumping means. A pumping means is designed to make the fluid circulate under pressure in the single pipe of the duct 2, then to pass through the flow control valve 1.

Thus, the fluid transported passes into the interior of the fluid transport pipes 3.

The valve according to the invention can be put implemented with a fluid with a viscosity which is at least that of the water, and in particular is between 0.5 cP and 100 cP.

The invention relates in particular to control of the flow of fluids used in EOR, in particular the aqueous solutions of polymer. These solutions comprise a hydrosoluble polymer with a high molecular mass, in particular greater than $10^6$ Da (Dalton: 1 Da=1 g/mol). The molecular mass of the polymer can be between $1.5 \cdot 10^6$ Da and $50 \cdot 10^6$ Da, in particular between $8 \cdot 10^6$ Da and $30 \cdot 10^6$ Da. Because of its industrial availability and its low cost, the polymer solution is most often a partly hydrolyzed polyacrylamide solution. Polyacrylamide has low sensitivity to biodegradation, it is less expensive than biopolymers, and is very widely used in EOR applications, but it is particularly sensitive to breakage of its chains.

The invention can also be implemented with other types of fluids, in particular fluids which are liable to be degraded, i.e. the viscosity of which can decrease, for example emulsions. The valve can also be used for non-resilient fluids, such as water for example, in order to take advantage of the low speeds in the equipment, and thus of the greater resistance to wear by attrition.

The degradation of the fluid is calculated by means of the following formula:

$$Deg(\%) = \frac{\eta_E - \eta_S}{\eta_E - \eta_{Flu}} \times 100$$

where $\eta_E$ and $\eta_S$ are the viscosity of the fluid, respectively upstream and downstream from the flow control valve 1, and $\eta_{Flu}$ is the viscosity of the fluid without polymer.

Advantageously the degradation of the fluid after passage in the valve is less than 25%, preferably less than 10%, and more preferably less than 5%.

From an economic point of view, it is highly advantageous to limit the degradation of a polymer solution in order to use a smaller quantity of polymer.

The flow control valve according to the invention functions according to the following principle.

Figure 4:
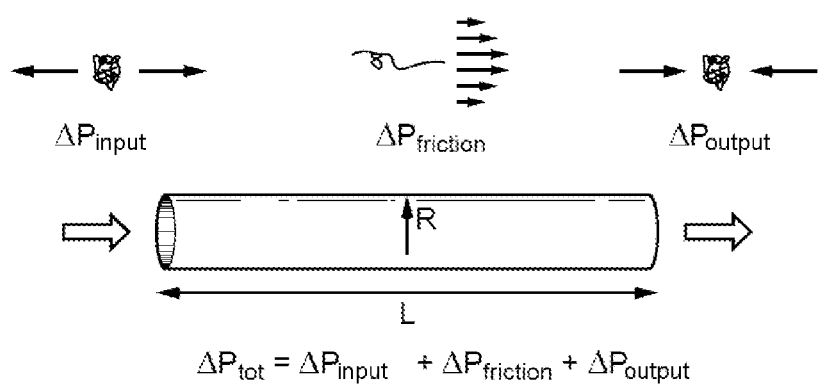
FIG. 4 represents the loss of load along a pipe with a constant cross-section.

In a pipe with a constant cross-section (FIG. 4), the total loss of load corresponds to the sum of the loss of load at the input of the pipe (ΔP input), the loss of load by friction on the walls of the pipes (ΔP friction) and the loss of load at the output of the pipe (ΔP output). The loss of load at the input (ΔP input) must be low, such that the polymer is not degraded. Thus:

$$\Delta P_{friction} \propto \frac{1}{R^4} \text{ and } \dot{\gamma} \propto \frac{1}{R^3}$$

where R is the radius of the pipe,
meaning that there is every advantage in working with capillary units with small diameters (which will maximize the loss of load and minimize the shearing). In general, if the diameter of the capillary unit is larger than 1 mm, the loss of load by friction is low. It is thus necessary to use very long capillary units. It is thus no longer possible to produce a compact valve.

The valve according to the invention makes it possible to generate additional, non-degrading loss of load on capillary units with a diameter larger than 1 mm, by means of putting into place alternation of contractions and widenings within the capillary unit, which will create loss of load at each narrowing output and input. This approach is a priori paradoxical, since narrowing is liable to give rise to mechanical degradation of the polymer. However, in a conventional valve, the speeds are very high during passage through a single orifice. With this invention, putting into series a large number of contractions/widenings makes it possible to maximize the loss of load. It is then no longer necessary to work at high speeds. Consequently, the levels of deformation which are exerted on the polymer are far lower, and thus far less degrading. The present invention makes it possible to maximize the input and output loss of load in the capillary unit, whilst avoiding degradation of the polymer solution.

Figure 5:
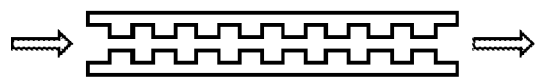
FIG. 5 represents an embodiment of a fluid transport pipe with a geometrically variable cross-section.

Instead of using pipes with a constant cross-section along their main axis, as in the prior art, the valve according to the invention comprises a plurality of fluid transport pipes with a geometrically variable cross-section, as represented in FIG. 5.

Said pipes are disposed in parallel relative to one another, for example as represented in FIG. 3.

According to the present invention, the term "in parallel" means that the fluid transport pipes 3 are disposed such that the fluid discharged from the duct 2 can (in the absence of shutting) be distributed in all the transport pipes 3. In other words, the total flow of fluid in the duct 2 is the sum of the individual flows of fluid in the different fluid transport pipes 3, each of these individual flows being other than zero (unless some of the fluid transport pipes 3 are shut). The term "in parallel" does not necessarily mean that the axes of the fluid transport pipes 3 are parallel to one another in the geometric sense, although such a situation is possible, and even preferable for reasons of simplicity of design. The pipes can for example be rolled in parallel. The number of pipes in the control valve depends on the flow required in the valve, the loss of load required, the maximum degradation permitted for the fluid, and, it will be appreciated, the geometry and the dimensions of the pipes. Example 4 describes a means for determining the number of pipes necessary to produce the valve according to the invention.

Typically, the number of pipes in the control valve is more than 10, preferably it is between 1,000 and 10,000, more preferably it is between 2,500 and 10,000, and even more preferably it is between 5,000 and 10,000. In fact, the presence of a large number of fluid transport pipes 3 makes it possible, for a given loss of load, to control the flow accurately, whilst minimizing the degradation of the fluid, and limiting the dimensions of the flow control valve 2. The number of pipes necessary depends on the maximum flow of the valve.

According to the present invention, the term "cross-section" designates the surface area of the inner space of a fluid transport pipe 3 which is perpendicular to the main axis of the fluid transport pipe 3, i.e. perpendicular to the mean direction of the flow of fluid.

According to the present invention, the term "pipe with a geometrically variable cross-section" means that the cross-section of the fluid transport pipe 3 varies along the main axis of the pipe, and is thus not constant. The variation of the cross-section of the pipe is such that the pipe has in its inner space a succession of contractions and widenings.

According to one embodiment, the fluid transport pipe 3 with a geometrically variable cross-section has alternation of cross-sections with small diameters and large diameters.

According to the present invention, the expression "alternation of cross-sections with small diameters and large diameters" means that in a fluid transport pipe 3, a first cross-section with a small diameter (narrowing) is followed by a first cross-section with a large diameter (widening), which itself is followed by a second cross-section with a small diameter, on the understanding that this diameter is not necessarily identical to that of the first cross-section with a small diameter, which itself is followed by a second cross-section with a large diameter, on the understanding that this diameter is not necessarily identical to that of the first cross-section with a large diameter, and so on along the axis of said fluid transport pipe 3. For reasons of simplicity of design, it is preferable for the pipe to have a single cross-section with a small diameter and a single cross-section with a large diameter which succeed one another in an alternating manner.

Figure 6A:
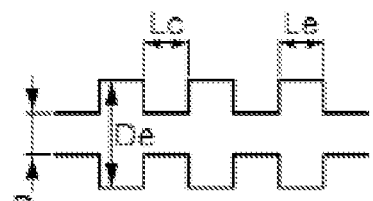
FIGS. 6a, 6b, 6c, 6d represent the variation of a cross-section with a small diameter towards a cross-section with a large diameter, or the variation of a cross-section with a large diameter towards a cross-section with a small diameter, respectively, which is in the form of a crenellation, or is hyperbolic, logarithmic or exponential.
Figure 6B:
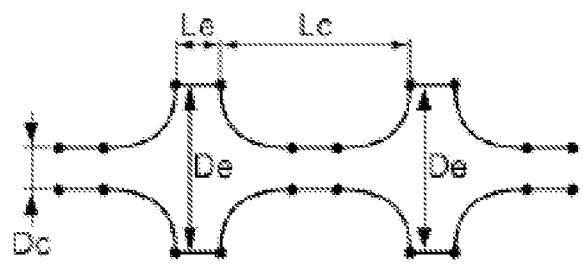
Figure 6C:
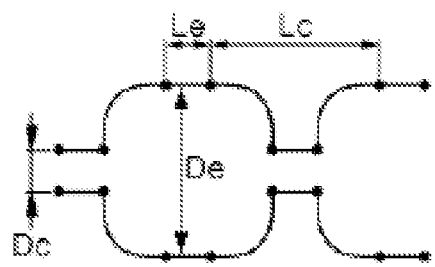
Figure 6D:
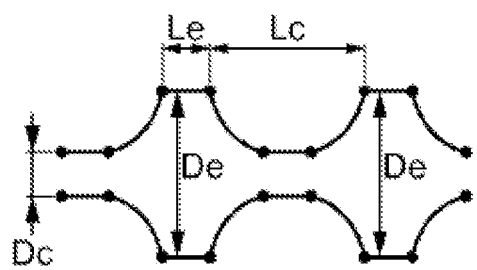

The variation of a cross-section with a small diameter and a cross-section with a large diameter, or the variation of a cross-section with a large diameter and a cross-section with a small diameter can be in the form of a crenellation (FIG. 6a), or it can be exponential (FIG. 6b), logarithmic (FIG. 6c), or hyperbolic (FIG. 6d). For reasons of simplicity of design, it is preferably in the form of a crenellation.

Advantageously, the alternation of cross-sections with small diameters and large diameters in a fluid transport pipe 3 with a geometrically variable cross-section makes it possible to create the loss of load at the input and output of a cross-section with a small diameter, and reciprocally at the output and input of a cross-section with a large diameter, whilst minimizing the degradation of the fluid.

Le indicates the distance between two cross-sections with small diameters, i.e. the distance along the axis of the pipe between the start and end of a cross-section with a large diameter.

Lc indicates the distance between two cross-sections with large diameters, i.e. the distance along the axis of the pipe between the end of a cross-section with a large diameter and the start of the following cross-section with a large diameter.

According to a particular embodiment, the alternation of cross-sections with small diameters and large diameters in the fluid transport pipe 3 is periodic.

According to the present invention, periodic alternation means the fact that the distance Lc and the distance Le are always the same.

According to a particular embodiment, the distance Le between two cross-sections with small diameters is in the range between 0.5 mm and 20 mm, preferably between 0.5 mm and 10 mm, and still more preferably between 0.5 mm and 2 mm.

According to a particular embodiment, the distance Lc between two cross-sections with large diameters is in the range between 0.5 mm and 20 mm, preferably between 0.5 mm and 10 mm, and still more preferably between 0.5 and 2 mm.

There is no restriction on the form of the cross-section of the pipe, but for reasons of simplicity of design, the cross-section is preferably a circular form.

The loss of load increases when the diameter De of the large cross-section increases, but this has little effect on the degradation of the fluid.

According to a particular embodiment, the cross-section with a small diameter has a diameter Dc of 0.5 mm or more, preferably between 0.75 mm and 5 mm, and still more preferably between 1 mm and 2 mm.

According to a particular embodiment, the cross-section with a large diameter has a diameter De of 5 mm or less, preferably between 0.75 mm and 4 mm, and still more preferably between 2 mm and 3 mm.

In a particular variant, the cross-sections with a small diameter along the pipe all have the same diameter Dc, and the cross-sections with a large diameter along the pipe all have the same diameter De, which is larger than the diameter Dc of the cross-sections with a small diameter.

The loss of load and the degradation decrease when the diameter of the small cross-section increases, i.e. when the ratio of a cross-section with a large diameter to a cross-section with a small diameter decreases.

According to one embodiment, the ratio of a cross-section with a large diameter to a cross-section with a small diameter is greater than 1, and 10 or less, and in particular it is approximately 2.

In fact, the degradation of the polymer solution and the loss of load decrease with the ratio of a cross-section with a large diameter to a cross-section with a small diameter. A ratio of approximately 2 is a good compromise between the loss of load and the degradation.

According to one embodiment, the ratio of the distance Lc between two cross-sections with large diameters to the diameter De of the cross-section with a large diameter is between 0.1 and 30, preferably between 0.25 and 10, and still more preferably between 0.5 and 5.

According to one embodiment, the ratio of the distance Le between two cross-sections with small diameters to the diameter Dc of the cross-section with a small diameter is between 0.1 and 30, preferably between 0.5 and 5, and still more preferably between 1 and 5.

The loss of load created by the valve according to the invention varies linearly with the number n of contractions/widenings which the pipes comprise. Typically, this number n is between 50 and 1,000, in particular between 500 and 1,000, and more particularly between 600 and 800.

On the other hand, this number n has little influence on the degradation of the polymer solution. In fact, the degradation is greatest during the passage in the first contractions.

The loss of load created by the valve according to the invention increases with the length of the pipes.

According to one embodiment, the length of the fluid transport pipes 3 is less than 1,500 mm, preferably between 100 mm and 1,000 mm, and still more preferably between 500 mm and 1,000 mm.

Advantageously, this range of lengths makes it possible to obtain the flow control valve 1 according to the invention in compact dimensions, which are thus particularly appropriate for use in the petroleum industry, on a platform or on a petroleum deposit on land.

According to one embodiment, the flow of the hydrosoluble polymer solution in the fluid transport pipes 3 is less than 500 ml/minute, preferably between 100 ml/minute and 300 ml/minute, and more preferably between 150 ml/minute and 250 ml/minute.

According to one embodiment, the flow of the hydrosoluble polymer solution in the flow control valve 1 is less than 300 m$^3$/h, preferably between 10 m$^3$/h and 250 m$^3$/h, and more preferably between 10 m$^3$/h and 200 m$^3$/h.

According to one embodiment, the loss of load between the input and the output of the flow control valve is less than 100 bars, preferably between 15 bars and 75 bars, and more preferably between 30 bars and 50 bars.

The flow control valve 1 can be without shutting means 5. In this case, the fluid always circulates in all of the fluid transport pipes 3, and the loss of load generated can not be regulated by the operator independently from the flow.

The connection means 4 make it possible to connect the flow control valve 1 to the duct 2. For example the connection means are connection flanges.

However, it is preferable to provide means 5 for shutting the fluid transport pipes 3, which can be activated remotely (for example by hydraulic control or by electrical control). Preferably, these shutting means 5 are disposed at the input, or optionally at the output of the fluid transport pipes 3.

According to one embodiment, the flow control valve 1 comprises means 5 for shutting at least some of the fluid transport pipes 3. The shutting of some or all of the fluid transport pipes 3 can be selective in order for the flow control valve 1 according to the invention to regulate the loss of load and the flow accurately and virtually continuously.

Figure 7:
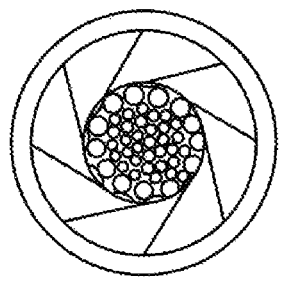
FIG. 7 represents schematically a flow control valve according to the invention, provided with a diaphragm as a shutting means.

According to one embodiment, the shutting means 5 comprise a diaphragm (FIG. 7), fins, a multiple-way valve, or a piston.

The fluid transport pipes 3 can have a size or form which is identical or different.

Figure 8:
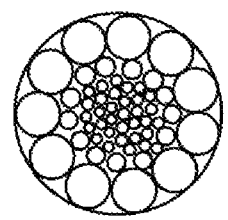
FIG. 8 represents schematically a concentric distribution of the fluid transport pipes.
Figure 9:
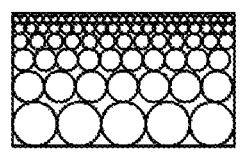
FIG. 9 represents schematically a distribution of the fluid transport pipes according to parallel lines.

According to one embodiment, they are disposed in the flow control valve 1 in groups with a cross-section which is substantially identical, on a plane perpendicular to the main axis of the valve. The distribution can for example be carried out according to concentric circles, each circle comprising pipes with an identical cross-section, with the cross-sections of the pipes increasing from the interior towards the exterior of the valve (FIG. 8). They can also be distributed according to parallel lines, each line comprising pipes with an identical cross-section on a plane perpendicular to the main axis of the valve, the lines being disposed according to an order with an increasing cross-section (FIG. 9). For a given flow, it is possible to decrease the loss of load created by the valve by adding pipes with a larger cross-section, which are necessarily less degrading for the fluid.

Advantageously, it is possible to control the loss of load at a given flow of fluid transported in the flow control valve 1 by modifying the arrangement of the fluid transport pipes 3 according to their cross-section. Consequently, modifying the arrangement makes it possible to adapt the flow control valve 1 according to the invention easily in accordance with the operative conditions, and in particular the viscosity of the fluid transported, the flow, and/or the loss of load.

The plurality of fluid transport pipes 3 with a geometrically variable cross-section can advantageously be formed by stacking either washers with different cross-sections, or discs which are perforated with holes.

Figure 10:
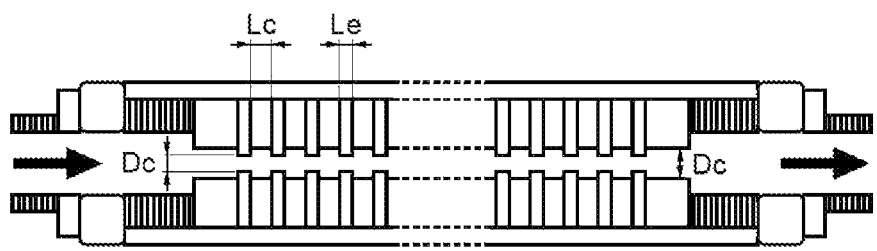
FIG. 10 represents schematically a stack of washers, with alternation of washers with small cross-sections and washers with large cross-sections.

According to one embodiment, the fluid transport pipes 3 with a geometrically variable cross-section are formed by a stack of washers with different cross-sections (FIG. 10).

Each washer has a hole in its center. There are no restrictions concerning the form of the hole, but for reasons of simplicity of design, the hole preferably has a cylindrical form.

According to the present invention, the cross-section of the washer corresponds to the surface area of the space of the hole which is perpendicular to the axis of the washer. A stack of washers with different cross-sections thus makes it possible to form a pipe with a geometrically variable cross-section.

With reference to FIG. 10, the stack of washers has in particular alternation of washers with small cross-sections 6 and washers with large cross-sections 7.

The diameter of the hole in the washer with a small cross-section corresponds to the diameter Dc of the cross-section with a small diameter of the pipe.

The diameter of the hole in the washer with a large cross-section corresponds to the diameter De of the cross-section with a large diameter.

The thickness of a washer with a small cross-section corresponds to the distance Lc between two cross-sections with a large diameter of the fluid transport pipe 3. The thickness of a washer with a large cross-section corresponds to the distance Le between two cross-sections with a small diameter of the fluid transport pipe 3.

According to a particular embodiment, the washers with different cross-sections can be made of stainless steel or not of stainless steel, of aluminum, or copper, but preferably of stainless steel.

Advantageously, the stacking of washers with different cross-sections is rapid and easy to implement, and the flow control valve 1 is thus easy to implement. In addition, it is easy to change one of said washers in order to adapt the flow control valve 1 to the operative conditions, in particular to the viscosity of the polymer solution, the flow, and/or the loss of load.

According to another embodiment, the fluid transport pipes 3 with a geometrically variable cross-section are formed by a stack of discs perforated with holes with different cross-sections, or by a stack of square or rectangular plates perforated with holes with different cross-sections.

As is the case for the washers, there is no restriction concerning the form of the holes, but for reasons of simplicity of design, the holes preferably have a cylindrical form.

According to the present invention, the cross-section of a hole in a disc or plate corresponds to the surface area of the space of the hole which is perpendicular to the axis of the disc. A disc or a plate can comprise holes with cross-sections which are identical, or holes with different cross-sections.

According to one embodiment, the holes are disposed in the disc or the plate in groups with a cross-section which is substantially identical on a plane perpendicular to the main axis of the disc or the plate. In the case of the disc, their distribution can for example be carried out according to concentric circles, each circle comprising identical cross-sections, with the cross-sections of the holes increasing from the interior towards the exterior of the valve. In the case of the plate, the holes can be distributed according to parallel lines, each line comprising holes with an identical cross-section on a plane perpendicular to the main axis of the plate, the lines being disposed according to an order with an increasing cross-section.

The stack of discs or plates perforated with holes, the axes of which coincide with one another, makes it possible to form a plurality of pipes disposed in parallel to one another. The alternation of holes with cross-sections which are different from one disc or plate to another makes it possible to form a plurality of pipes with a geometrically variable cross-section.

In particular, the stack of perforated discs/plates has alternation of discs/plates comprising holes with small cross-sections, and discs/plates comprising holes with large cross-sections.

The diameter of a hole with a small cross-section corresponds to the diameter Dc of the cross-section with a small diameter of a pipe.

The diameter of a hole with a large cross-section corresponds to the diameter De of the cross-section with a large diameter of the pipe.

As is the case for the washers, the discs/plates perforated with holes with different cross-sections can be made of stainless steel or not of stainless steel, of aluminum, or copper, but preferably of stainless steel.

Advantageously, the stack of discs/plates perforated with holes with different cross-sections is rapid and easy to implement, and the flow control valve 1 is thus easy to implement. In addition, it is easy to change a perforated disc in order to adapt the flow control valve 1 to the operative conditions, in particular the viscosity of the polymer solution, the flow, and/or the loss of load.

EXAMPLES

Example 1

Figure 1:
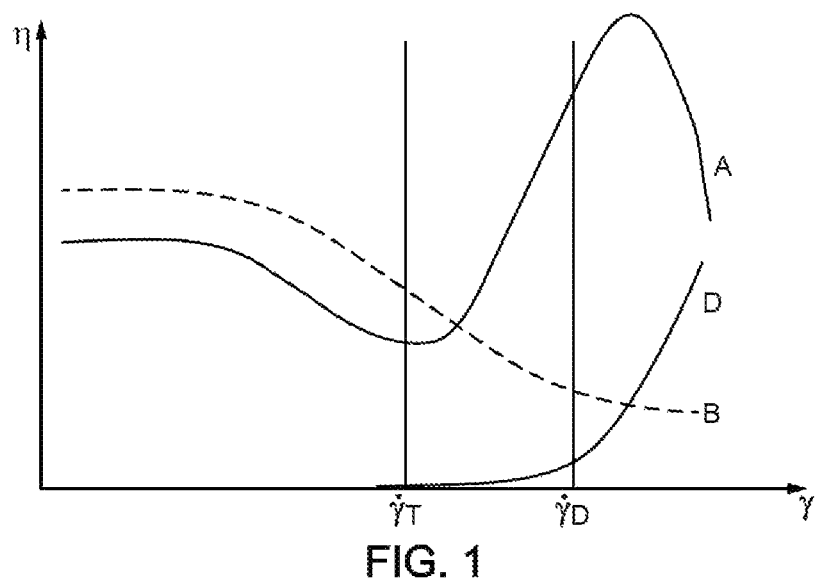
FIG. 1 represents the rheological behavior of a polymer solution in a porous medium A in comparison with in a bulk medium B.
Figure 2:
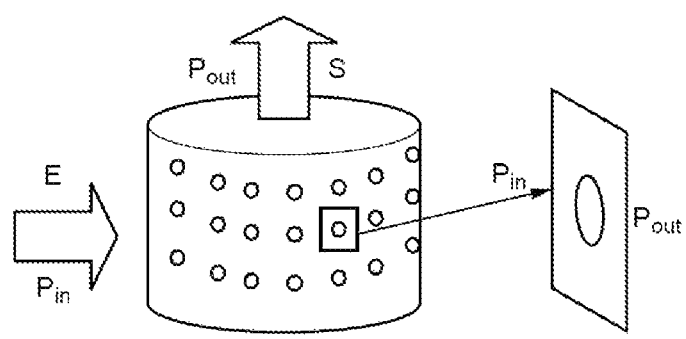
FIG. 2 represents schematically a flow control valve according to the prior art, wherein the fluid enters through the holes in a cage, and the output, which is perpendicular, is at the center of the cage.

Degradation of a Polymer Solution After Passage in a Flow Control Valve According to the Prior Art (Cage Pierced with Holes as Represented in FIG. 2)

Polymer: 3630S polyacrylamide with high and low molecular weights made by SNF Floerger, average molecular weight estimated as 18 MDa Concentration of the polymer: 800 ppm.

Flow range: 10-250 m$^3$/h.

The viscosity downstream from the flow control valve is measured according to the flow and the loss of load ΔP (difference between the pressure at the input of the flow control valve and the pressure at the output of the flow control valve).

The degradation of the polymer is calculated according to the following formula:

$$Deg(\%) = \frac{\eta_E - \eta_S}{\eta_E - \eta_{Flu}} \times 100$$

where $\eta_E$ and $\eta_S$ are the viscosity of the fluid, respectively, upstream and downstream from the flow control valve, and $\eta_{Flu}$ is the viscosity of the water.

Figure 11:
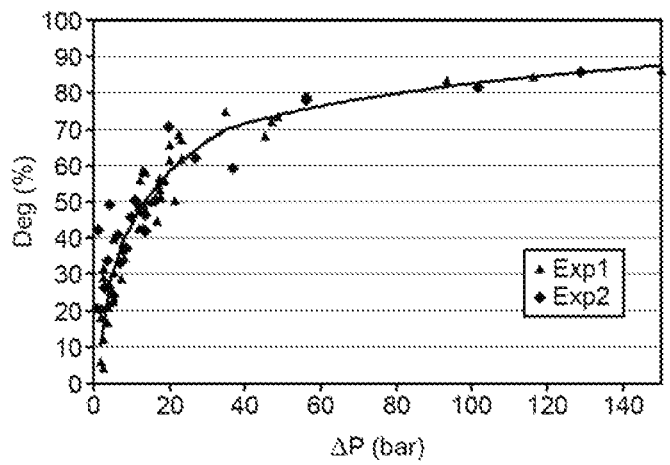
FIG. 11 represents the degradation of a polymer solution after passage in a fluid transport of the prior art as a function of the loss of load.

The experiment was carried out twice, and the results are represented in FIG. 11. As the two experiments show, irrespective of the flow and the opening of the flow control valve, the degradation depends only on the loss of load ΔP.

Example 2

Degradation of a Polymer Solution and Loss of Load After Passage in a Fluid Transport Pipe with a Geometrically Variable Cross-Section According to the Invention In the following examples, the fluid transport pipe with a geometrically variable cross-section consists of alternation of washers with a small cross-section and a large cross-section. These washers have an outer diameter of 1.5 cm, and are pierced in their center by a circular hole, the diameter of which is between 1 mm and 3 mm. They are aligned in a pipe with an inner cross-section of 1.5 cm. The sealing between the washers is ensured by their contact.

Example 2a

Influence of the Length of the Pipe and of the Flow

In this example, the diameter of the hole in the washers with a small cross-section, Dc, is 1.4 mm, and the diameter of the hole in the washers with a large cross-section is 2 mm. The length of the washers is 5 mm (Lc=Le).

The length of the pipe is 5 cm, 10 cm or 15 cm. The polymer solution is the same as that in example 1.

The loss of load ΔP is measured (difference between the pressure at the input of the pipe and the pressure at the output of the pipe) as is the viscosity of the fluid at the input and the output of the pipe, according to the flow in the pipe (50-400 m³/h).

The degradation (Deg) of the polymer solution is calculated as in example 1.

Figure 12:
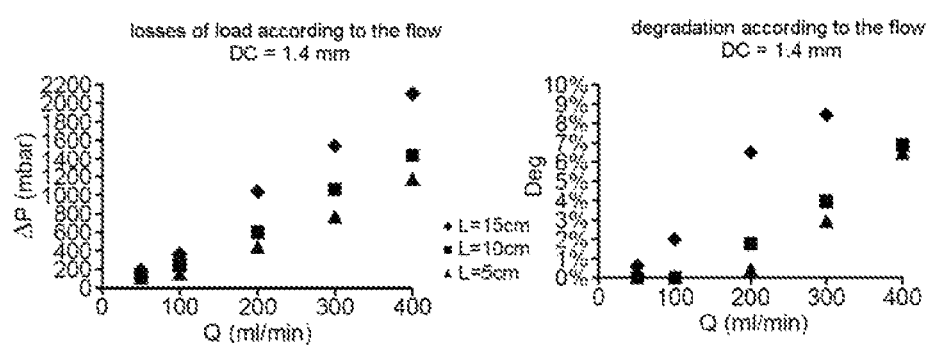
FIG. 12 represents the degradation of a polymer solution and the loss of load as a function of flow after passage in a fluid transport pipe with a geometrically variable cross-section according to the invention (example 2a).

The results are represented in FIG. 12. The curves show that the loss of load increases with the length of the pipe. However, irrespective of the length of the pipe, the degradation remains less than 8% for a flow of less than 300 cc/min.

Example 2b

Influence of the Distance Between Two Contractions and of the Flow

In this example, the diameter of the hole in the washers with a small cross-section is 1.4 mm, and the diameter of the hole in the washers with a large cross-section is 2 mm.

The length of the pipe is 10 cm. The distance between two widenings Lc is 5 mm.

The distance Le between two contractions (cross-sections with a small diameter) is 5 mm, 10 mm or 20 mm.

The polymer solution is identical to that in example 2a.

The loss of load ΔP is measured (difference between the pressure at the input of the pipe and the pressure at the output of the pipe) according to the distance Le for a flow of 100 ml/min, 200 ml/min or 300 ml/min.

The viscosity of the fluid is measured at the input and the output of the pipe, according to the flow in the pipe (from 50 ml/min to 400 ml/min) for each Le, and the degradation (Deg) of the polymer solution is calculated as in example 1.

Figure 13:
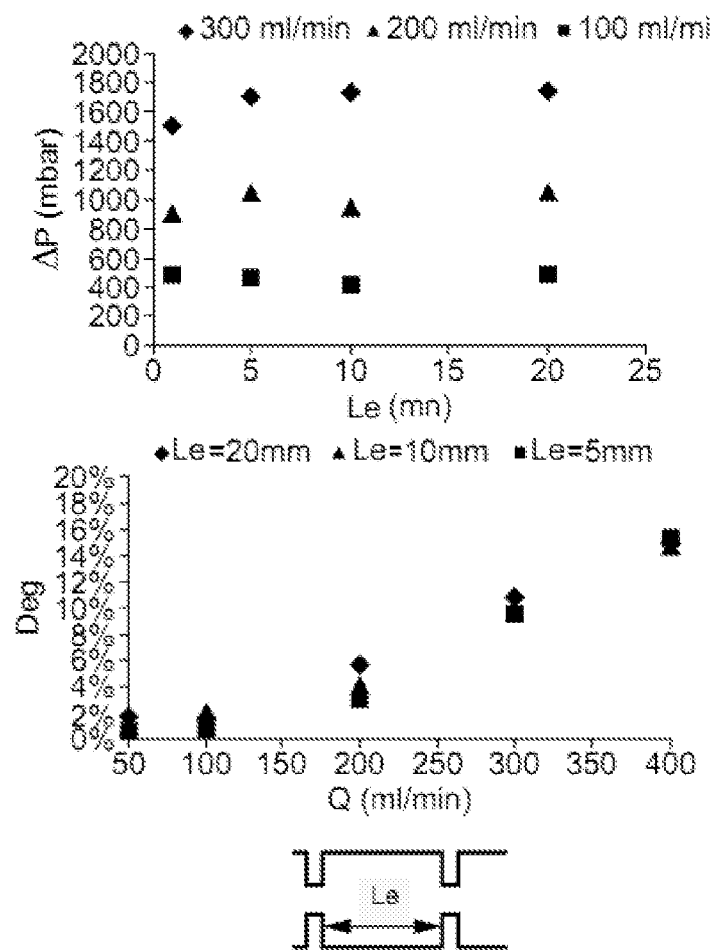
FIG. 13 represents the degradation of a polymer solution and the loss of load as a function of flow or as a function of the distance between two contractions after passage in a fluid transport pipe with a geometrically variable cross-section according to the invention (example 2b).

The results are represented in FIG. 13. The curves show that the degradation of the polymer solution depends little on the distance between two contractions (Le) provided that the distance is sufficient. In fact, the loss of load seems to increase when Le increases. It seems necessary to have a minimum length Le.

Example 2c

Influence of the Cross-Section with a Small Diameter and of the Flow

In this example, the diameter of the hole in the washers with a large cross-section is 2 mm, and the diameter of the hole in the washers with a small cross-section is varied (1.4 mm or 1.6 mm).

The length of the pipe is 30 cm. Le=Lc=5 mm.

The polymer solution is identical to that in example 2a.

The loss of load ΔP is measured (difference between the pressure at the input of the pipe and the pressure at the output of the pipe) according to Dc for a flow of 200 ml/min, 300 ml/min or 400 ml/min.

The viscosity of the fluid is measured at the input and the output of the pipe according to Dc for a flow of 200 ml/min, 300 ml/min or 400 ml/min and the degradation (Deg) of the polymer solution is calculated as in example 1.

Figure 14:
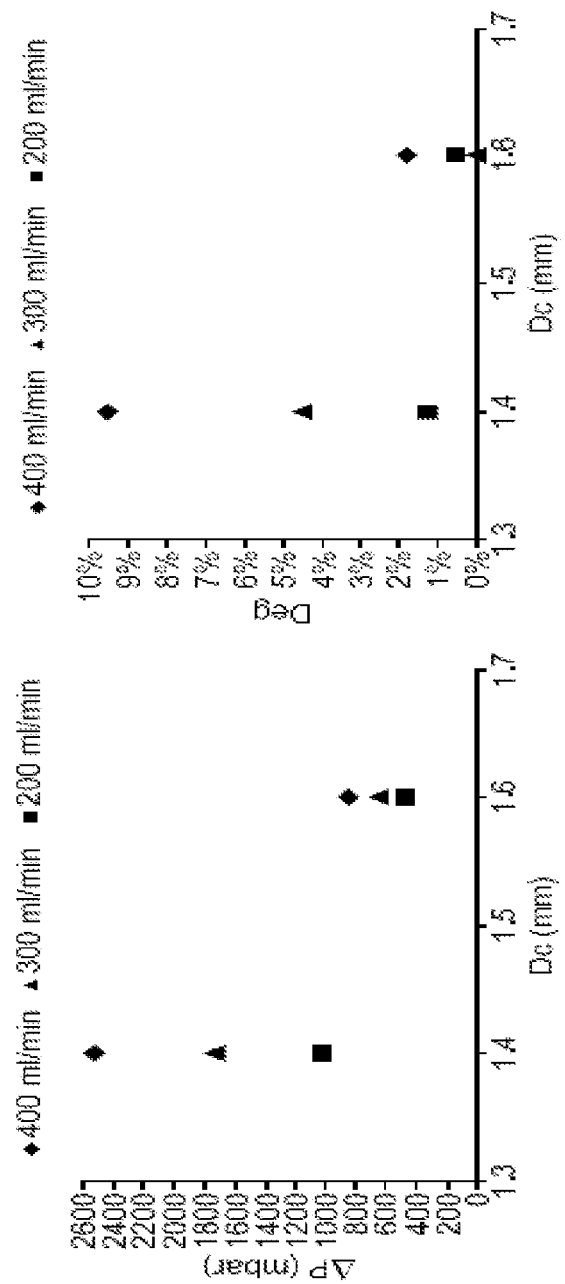
FIG. 14 represents the degradation of a polymer solution and the loss of load as a function of flow or as a function of diameter Dc after passage in a fluid transport pipe with a geometrically variable cross-section according to the invention (example 2c).

The results are represented in FIG. 14. The curves show that the loss of load and the degradation decrease when the ratio of the diameter with a large cross-section to the diameter with a small cross-section increases.

Example 2d

Influence of the Cross-Section with a Large Diameter and of the Flow

In this example, the diameter of the hole in the washers with a small cross-section is 1 mm, and the diameter De of the hole in the washers with a large cross-section is varied (2 mm, 2.2 mm or 3 mm).

The length of the pipe is 10 cm. Le=Lc=5 mm.

The polymer solution is identical to that in example 2a.

The loss of load ΔP is measured (difference between the pressure at the input of the pipe and the pressure at the output of the pipe) according to De for a flow of 300 ml/min or 400 ml/min.

The viscosity of the fluid is measured at the input and at the output of the pipe according to De for a flow of 300 ml/min or 400 ml/min and the degradation (Deg) of the polymer solution is calculated as in example 1.

The results are represented in FIG. 15. The curves show that the loss of load increases slightly with the diameter De. On the other hand the diameter De has little effect on the degradation.

Example 2e

Influence of the Number of Contractions/Widenings n and of the Flow

In this example, the diameter of the hole in the washers with a small cross-section is 1 mm and the diameter of the hole in the washers with a large cross-section is 2 mm.

The length of the pipe is proportional to the number of contractions/widenings n. Le=Lc=1 mm.

The polymer solution is identical to that in example 2a.

The loss of load ΔP is measured (difference between the pressure at the input of the pipe and the pressure at the output of the pipe) according to n for a flow of 100 ml/min, 200 ml/min or 300 ml/min.

The viscosity of the fluid is measured at the input and at the output of the pipe according to n for a flow of 100 ml/min, 200 ml/min or 300 ml/min and the degradation (Deg) of the polymer solution is calculated as in example 1.

The results are represented in FIG. 16. The curve show that the loss of load increases linearly with the number of contractions/widenings n, (ΔP=54*n+893.33). On the other hand, the number of contractions/widenings n has little effect on the degradation.

Example 3

Comparison of the Losses of Load by Friction Calculated with Those Measured Experimentally on a Pipe Comprising 13 Contractions in Series In this example, the pipe comprises alternation of 13 contractions and widenings, wherein Lc=Le=1 mm, and Dc=1 mm, De=2 mm.

The loss of load calculated for an equivalent system without alternation of contractions and widenings is equal to the sum of the loss of load of a pipe 6.5 mm long with an inner cross-section of 1 mm, and the loss of load of a pipe 6.5 mm long with an inner cross-section of 2 mm.

This loss of load calculated is compared with the loss of load measured experimentally according to the flow.

Figure 17:
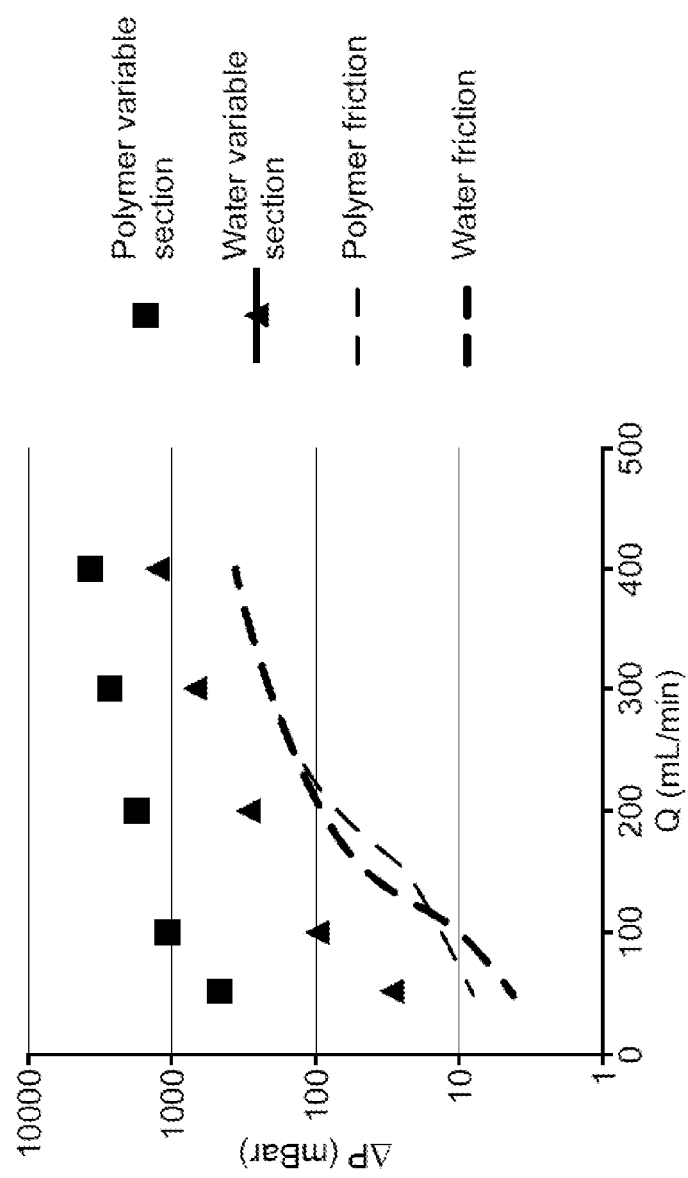
FIG. 17 represents the loss of load as a function of flow after passage in a fluid transport pipe with a geometrically variable cross-section according to the invention (example 3).

See FIG. 17. The losses of load calculated for a system without alternation are represented by curves in broken lines (thin line for the water, thick line for a polymer solution). The pressure values measured are represented by the triangles for the water and by the solid squares for the polymer solution.

It can be seen in FIG. 17 that the loss of load of a pipe according to the invention comprising alternation of contractions and widenings is multiplied for a polymer solution by a factor of 100 with a low flow level, and a factor of 10 with a high flow level, in comparison with the loss of load calculated for a system which is equivalent, but does not comprise alternation of contractions/widenings.

The pipe according to the invention thus makes it possible to generate a loss of load on capillary units with a diameter larger than 1 mm. The maximization of the loss of load by means of the succession of end effects also makes it possible to maximize the loss of load of a non-resilient fluid such as water.

Example 4

Production of a Flow Control Valve According to the Invention

Flow required in the valve=100 m$^3$/h.
Loss of load required after passage through the valve=40 bars.

A pipe is formed by stacking washers pierced with a circular hole with a cross-section of 1 mm, alternating with washers pierced with a hole with a cross-section of 2 mm.

The distance Le between two widenings is 1 mm.
The distance Lc between two contractions is 1 mm.
According to example 2e, the maximum acceptable flow is 200 ml/min if it is wished to obtain degradation of 10% at the most. In addition, it has been shown that for a flow of 200 ml/min, ΔP=54*n+893.33, where n=number of contractions/widenings.

Thus, in these conditions, n=724 if it is wished to obtain a loss of load of 40 bars.

The length of the pipe is thus 724*2=1.45 m.
The flow in each pipe is 20 ml/min.
The flow required in the valve is 100 m$^3$/h.
The flow in each pipe is 200/1,000/1,000/60=3,600 m$^3$/h.
For this purpose, the valve according to the invention consists of:

$$N \text{ pipes} = Q_{\text{flow control valve}}(m^3/s) / Q_{\text{pipe}} (m^3/s) =$$
$$100/3{,}600 = 8{,}333 \text{ pipes in parallel.}$$

Taking into account a compact stack (compactness=0.9) of pipes with an inner cross-section of 2 mm and a wall thickness of 2 mm, a total diameter of 23 cm is obtained for the bundle of pipes.

If it is wished to obtain a smaller loss of load for the same flow of 100 m$^3$/h, it is necessary to add pipes with a larger diameter, which will necessarily be less degrading for the polymer solution. It is possible to envisage a total diameter of the bundle of pipes which permits control of the loss of load of approximately 30 cm.

Dimensions of the valve with a diameter of D=30 cm, and a length of L=155 cm seems to be acceptable.

The pipes with variable cross-sections can be arranged in the form of a faggot, as represented in FIG. 8. The pipes with a larger diameter on the periphery of the faggot make it possible to decrease the loss of load created by the valve.

The faggot of pipes can be produced by stacking perforated discs, the thickness of which corresponds to the length of the aforementioned washers.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A polymer solution transport duct comprising a first duct section, a second duct section and a flow control valve connecting the first duct section to the second duct section,
    wherein the first duct section and the second duct section together form a flow axis from the first duct section to the second duct section
    said flow control valve comprising:
        a plurality of fluid transport pipes with a geometrically variable cross-section, wherein the plurality of fluid transport pipes comprised in the fluid transport duct between the first and second duct sections are disposed in parallel relative to one another and to the flow axis, wherein the number of fluid transport pipes is 1000-10,000;
        a duct connector, situated at one end of the fluid transport pipes; and
        a shutter able to selectively shut all or part of the fluid transport pipes;
    wherein the fluid transport pipes with a geometrically variable cross-section comprise cross-sections with small diameters and cross-sections with large diameters, the cross-sections with small diameters alternating with the cross-sections with large diameters;
    wherein the number of cross-sections with small diameters and with large diameters is 500 to 1000, this number being determined based on a desired reduced flow rate at a plateau reached by a curve representing the polymer degradation as a function of the number of cross-sections with small diameters and with large diameters;
    wherein the small diameters are equal or greater than 0.5 mm;
    wherein the polymer solution transport duct has a polymer degradation percentage of lower than 10%.

2. The flow control valve as claimed in claim 1, wherein the distance between two of the cross-sections with small diameters is in the range between 0.5 mm and 20 mm.

3. The flow control valve as claimed in claim 1, wherein the distance between two of the cross-sections with large diameters is in the range between 0.5 mm and 20 mm.

4. The flow control valve as claimed in claim 1, wherein the cross-section with a large diameter has a diameter of 5 mm or less.

5. The flow control valve as claimed in claim 1, wherein the variation from the cross-section with a small diameter to the cross-section with a large diameter is in the form of a crenellation, or in hyperbolic, logarithmic or exponential form.

6. The flow control valve as claimed in claim 1, wherein the variation from the cross-section with a large diameter to the cross-section with a small diameter is in the form of a crenellation, or in hyperbolic, logarithmic or exponential form.

7. The flow control valve as claimed in claim 1, wherein the ratio of the cross-section with a large diameter to the cross-section with a small diameter is greater than 1 and 10 or less.

8. The flow control valve as claimed in claim 1, wherein the shutter permits selective shutting of some or all of the fluid transport pipes.

9. The flow control valve as claimed in claim 1, wherein the shutter comprises a diaphragm, fins, a multiple-way valve, or a piston.

10. The flow control valve as claimed in claim 1, wherein the fluid transport pipes do not all have identical cross-sections.

11. The flow control valve as claimed in claim 1, wherein the fluid transport pipes are disposed in groups with a substantially identical cross-section.

12. The flow control valve as claimed in claim 11, wherein the different groups of fluid transport pipes are distributed according to concentric circles, each circle comprising pipes with an identical cross-section, with the cross-sections of the pipes increasing from the interior towards the exterior of the valve.

13. The flow control valve as claimed in claim 11, wherein the different groups of fluid transport pipes are distributed according to parallel lines, each line comprising pipes with an identical cross-section, the lines being disposed according to an order with an increasing cross-section.

14. The flow control valve as claimed in claim 1, wherein the fluid transport pipes with a geometrically variable cross-section are formed by a stack of washers with different cross-sections.

15. The flow control valve as claimed in claim 14, wherein the stack of washers alternates washers with small cross-sections and washers with large cross-sections.

16. The flow control valve as claimed in claim 15, wherein the washers with small cross-sections have a thickness equal to the distance between two cross-sections with large diameters of the fluid transport pipe.

17. The flow control valve as claimed in claim 14, wherein the washers with a large cross-section have a thickness equal to the distance between two cross-sections with small diameters of the fluid transport pipe.

18. The flow control valve as claimed in claim 1, wherein the fluid transport pipes with a geometrically variable cross-section are formed by a stack of perforated discs with holes with different cross-sections.

19. The flow control valve as claimed in claim 18, wherein the stack of perforated discs has alternation of discs comprising holes with small cross-sections and discs comprising holes with large cross-sections.

20. The flow control valve as claimed in claim 19, wherein the discs comprising holes with small cross-sections have a thickness equal to the distance between two discs comprising holes with small cross-sections.

21. The flow control valve as claimed in claim 19, wherein the discs comprising holes with large cross-sections have a thickness equal to the distance between two discs comprising holes with small cross-sections.

22. The flow control valve as claimed in claim 18, wherein the discs are perforated with holes distributed according to concentric circles, each circle comprising holes with an identical cross-section, with the cross-sections of the holes increasing from the interior towards the exterior of the valve.

23. The flow control valve as claimed in claim 1, wherein the fluid transport pipes with a geometrically variable cross-section are formed by a stack of square or rectangular plates perforated with holes with different cross-sections.

24. The flow control valve as claimed in claim 23, wherein the stack of perforated plates has alternation of plates comprising holes with small cross-sections and plates comprising holes with large cross-sections.

25. The flow control valve as claimed in claim 24, wherein the plates comprising holes with small cross-sections have a thickness equal to the distance between two plates comprising holes with small cross-sections.

26. The flow control valve as claimed in claim 24, wherein the plates comprising holes with large cross-sections have a thickness equal to the distance between two plates comprising holes with small cross-sections.

27. The flow control valve as claimed in claim 23, wherein the plates are perforated with holes distributed according to parallel lines, each line comprising pipes with an identical cross-section, the lines being disposed according to an order with an increasing cross-section.

28. A flow control valve which is connected to a duct, said valve comprising:
   a plurality of fluid transport pipes with a geometrically variable cross-section, disposed in parallel relative to one another; wherein the number of fluid transport pipes is 1000-10,000;
   a duct connector, situated at one end of the fluid transport pipes; and
   a shutter able to selectively shut all or part of the fluid transport pipes, said shutter comprising a diaphragm that shuts the plurality of fluid transport pipes from an outer edge towards an inner portion;
   wherein all the fluid transport pipes of the flow control valve are all parallel to one another;
   wherein the fluid transport pipes with a geometrically variable cross-section comprise cross-sections with small diameters and cross-sections with large diameters, the cross-sections with small diameters alternating with the cross-sections with large diameters;
   wherein the number of cross-sections with small diameters and with large diameters is 500 to 1000, this number being determined based on a desired reduced flow rate at a plateau reached by a curve representing the polymer degradation as a function of the number of cross-sections with small diameters and with large diameters;
   wherein the small diameters are equal or greater than 0.5 mm; and
   wherein the fluid transport pipe has a polymer degradation percentage of lower than 10%.

29. A flow control valve which is connected to a duct, said valve comprising:
   a plurality of fluid transport pipes, each fluid transport pipe having a geometrically variable cross-section, wherein all the plurality of fluid transport pipes of the flow control valve are disposed in parallel relative to one another; wherein the number of fluid transport pipes is 1000-10,000;
   a duct connector, situated at one end of the fluid transport pipes; and a shutter able to selectively shut all or part of the fluid transport pipes;

wherein the fluid transport pipes with a geometrically variable cross-section comprise cross-sections with small diameters and cross-sections with large diameters, the cross-sections with small diameters alternating with the cross-sections with large diameters;

wherein the number of cross-sections with small diameters and with large diameters is 500 to 1000, this number being determined based on a desired reduced flow rate at a plateau reached by a curve representing the polymer degradation as a function of the number of cross-sections with small diameters and with large diameters;

wherein the small diameters are equal or greater than 0.5 mm, wherein for each of the fluid transport pipes, the cross-sections with small diameters and cross-sections with large diameters are coaxial to one another; and wherein the fluid transport pipe has a polymer degradation percentage of lower than 10%.

30. A method for transporting a polymer solution comprising:

injecting the polymer solution into a polymer solution transport duct including a first duct section, a second duct section and a flow control valve connecting the first duct section to the second duct section, wherein the first duct section and the second duct section together form a flow axis from the first duct section to the second duct section, wherein the flow control valve comprises:
   a plurality of fluid transport pipes with a geometrically variable cross-section, wherein the plurality of fluid transport pipes comprised in the fluid transport duct between the first and second duct sections are disposed in parallel relative to one another and to the flow axis, wherein the number of tubes is 1000-10,000;
   a duct connector, situated at one end of the fluid transport pipes; and
   a shutter able to selectively shut all or part of the fluid transport pipes;

wherein the fluid transport pipes with a geometrically variable cross-section comprise cross-sections with small diameters and cross-sections with large diameters, the cross-sections, with small diameters alternating with the cross-section with large diameters;

wherein the number of cross-sections with small diameters and with large diameters is 500 to 1000;

wherein the small diameters are equal or greater than 0.5 mm;

the method further comprising controlling the shutter so that the polymer solution flow rate through the flow control valve is lower than 250 m$^3$/h, thereby securing a polymer degradation percentage of lower than 10%.

* * * * *